F. W. Cox.
Pen & Pencil Case.
No. 2,525. Reissued Mar. 26, 1867.
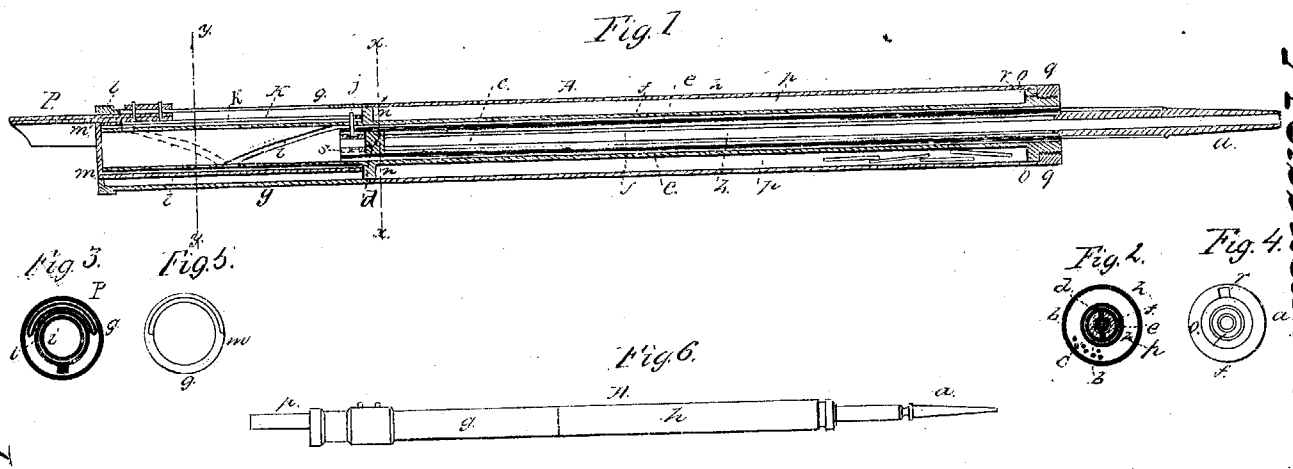
Witnesses.
Milly Livingston
Wm. Thurn
Inventor
Frederick W. Cox.
N. PETERS, PHOTO-LITHOGRAPHER, WASHINGTON, D. C.

United States Patent Office.

LAURENCE A. HEELY, OF NEW YORK, N. Y., ASSIGNEE BY MESNE ASSIGNMENTS OF FREDERICK W. COX.

*Letters Patent No.* 48,374, *dated June* 27, 1865; *reissue No.* 2,525, *dated March* 26, 1867.

PEN AND PENCIL CASE.

The Schedule referred to in these Letters Patent and making part of the same.

TO ALL WHOM IT MAY CONCERN:

Be it known that FREDERICK W. COX, of Brooklyn, in the county of Kings, and State of New York, has invented a new and improved Pen and Pencil Case; and I, LAURENCE A. HEELY, of No. 655 Greenwich street, in the city, county, and State of New York, do hereby declare that the following is a full, clear, and exact description thereof, which will enable those skilled in the art to make and use the same, reference being had to the accompanying drawing, forming part of this specification, in which—

Figure 1 represents a longitudinal central section of this invention in an enlarged scale.

Figure 2 is a transverse section of the same, the line *x x*, fig. 1, indicating the plane of section.

Figure 3 is a similar section taken in the plane indicated by the line *y y*, fig. 1.

Figure 4 is a detached end view of the collar closing the reserve-lead case.

Figure 5 is an end view of the upper end of the case, which may contain the pen.

Figure 6 is a side elevation of the same in a smaller scale than the previous figures.

Similar letters of reference in these views indicate corresponding parts.

The object of this invention is to produce a pencil case which combines the advantages of the ordinary propeller pencils and of pencil cases with movable tips, being constructed in such a manner that it is capable of carrying a long lead while it allows at the same time of fetching in the tip. It is also provided with a chamber capable of carrying one or more reserve leads of the full length, and it may be provided with a pen applied over the mechanism, which produces the longitudinally sliding motion of the tip or in any other place where it does not interfere with the reserve-lead chamber. Furthermore, the tube which carries the lead is provided with a groove so as to admit the pin or stud, which, in combination with a helical groove or screw, produces the longitudinally sliding motion of the tip, and thereby the construction of the pencil case is simplified.

In ordinary pencil cases with a longitudinally sliding tip, the traveller, which serves to feed the lead to the tip, moves back only to the inner end of the tip or to the band which forms the nut to receive said tip, and the length of the lead is determined by the tip. And in ordinary propeller pencils, which are capable of carrying a long lead, the tip has no longitudinal motion, and pencils of this kind cannot be conveniently carried in the pocket, since their projecting tips are liable to pierce the lining. Furthermore, ordinary propeller pencils are not provided with a reserve-lead chamber, and the reserve-lead chambers in ordinary pencil cases with longitudinally moving tips are made to receive short leads corresponding to the length of their tips. These disadvantages are obviated in the new pen and pencil case, which is constructed as follows: The tip *a* is secured in the end of the revolver *b*, the bore of which is equal to that of the tip, both being made to fit the lead to be used, and said revolver is provided with a band, which strengthens that part thereof into which the tip screws, and which is usually channelled or grooved so that it can be conveniently held with the fingers for the purpose of turning the revolver in either direction. The traveller *c* is fitted into the revolver, which is made of such a length that the same will allow of moving said traveller back below the inner end of the band, which receives the tip, and that room is obtained for long leads. In practice said revolver may be made of such a length that the same, together with the tip, extends throughout the whole length of the case A or nearly so, and that it is capable of carrying leads five or six times as long as those carried by ordinary pencil cases with longitudinally moving tips. The inner end of the traveller *c* is secured to a slide, *d*, which projects through slots in the revolver, and the edges of which are provided with screw-threads to engage with an internal screw-thread cut into the tube *e*, which encloses the revolver *b*. By turning the revolver independently of the tube *e* the traveller is made to move back and forth, and the length of the lead projecting from the tip can be regulated. The pin *j*, which produces the longitudinal motion of the tip, as will be presently explained, is secured in the tube *e*, and it projects through said tube into a circular groove, *s*, turned in the inner end of the revolver *b*. By the use of this groove the application of a cover to the revolver is rendered unnecessary, and at the same time the revolver *b* is prevented from moving in a longitudinal direction in the tube *e*. The tube *e* is surrounded by a tube, *f*, which extends throughout the entire length of the pencil case, and which is covered by the outside shell *g h*, as clearly shown in figs. 1 and 2 of the drawing. A portion of the tube *f* is provided with a helical slot, *i*, and the pin *j*, which projects from the tube *e*, is made to catch in said helical slot and also in a longitudinal rectilinear slot, *k*, in the covering tube *l*, which is firmly connected to the outer shell *g* of the case. By holding said outer shell and turning the tube *f* in the proper direction, the revolver and tip are made to move in a longitudinal direction or parallel to the axis of the case by the action of the pin *j* and helical slot *i*. This mechanism is well known, and it is in common use in pen and pencil cases, but it must be remarked that the longitudinal motion of the tip may be produced by a slide or other suitable means. The shell *g* is secured at its outer end to a ring, *m*, fastened to the tube *l*, and its inner end is guided by a ring, *n*, secured to the tube *f*. That end of the tube *f* next the tip is surrounded by the outside shell or case *h*, which is fastened at its upper or inner end to the ring *n*, and supported by a collar, *o*, secured to the outer end of the tube *f*, as clearly shown in fig. 1. The space between the tubes *f* and *h* forms the reserve-lead chamber *p*, and access is had to this space through an aperture, *r*, in the collar *o*, as shown in fig. 3. The space is closed by a cap, *q*, as clearly shown in fig. 1. This reserve chamber is capable of holding full-length leads, and by removing the cap *q* access can be had to it. P is the pen clip which is made to work over the screw *i* and between the shell *g* and the tube *t*, as shown in figs. 1 and 3. It will be noticed that the pen moves out on the opposite ends of the tip *a*, and it does not interfere with the reserve-lead case. If desired the outer shell *g h* may be made out of one piece, which in that case has to be secured to a ring attached to the tube *l*, and which, instead of being fastened to the collar *o*, turns loosely thereon. In this case the tip is moved in and out by holding the cap *q*, and turning the shell *g h*; but if the shell is made in two parts, as shown in the drawing, the tip is made to move in and out by holding the tube *h*, and turning the tube *g*, or *vice versa*.

What I claim as new, and desire to secure by Letters Patent, is—

1. Extending the longitudinally moving tube *e*, with the revolver *b*, to such a length into the case A that the traveller can be made to move back below or within the outer end of the tube *e*, as set forth, whereby a pencil case is obtained, the tip of which can be moved in and out, and which is capable of carrying long leads.

2. The circular groove *s* in the revolver *b*, in combination with the pin *j*, substantially as herein set forth, so that sufficient hold for the said pin is obtained without the necessity of a cap over the tube *e*, and at the same time the revolver is prevented from moving in a longitudinal direction.

3. The collar *o*, in combination with the tube *f* and shell *h*, substantially as and for the purpose specified.

4. The reserve-lead chamber *p*, extending partially or wholly round the revolver *b*, when the same is made with or without a longitudinal motion when said chamber is situated within the shell A, substantially as and for the purpose shown and described.

LAURENCE A. HEELY.

Witnesses:
W. HAUFF,
AMASA A. REDFIELD.